United States Patent
Hoover

(10) Patent No.: US 11,524,786 B2
(45) Date of Patent: Dec. 13, 2022

(54) DEPLOYABLE ARMREST WITH PAWL AND RATCHET HEIGHT ADJUSTMENT MECHANISM

(71) Applicant: AMI Industries, Inc., Colorado Springs, CO (US)

(72) Inventor: Douglas E. Hoover, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/483,456

(22) Filed: Sep. 23, 2021

(65) Prior Publication Data
US 2022/0089287 A1   Mar. 24, 2022

Related U.S. Application Data

(60) Provisional application No. 63/082,542, filed on Sep. 24, 2020.

(51) Int. Cl.
*B64D 11/06* (2006.01)
(52) U.S. Cl.
CPC ...... *B64D 11/0644* (2014.12); *B64D 11/0689* (2013.01)
(58) Field of Classification Search
CPC ............. B64D 11/0644; B64D 11/0689
USPC ............................................ 297/353, 411.36
See application file for complete search history.

(56) References Cited

U.S. PATENT DOCUMENTS

| | | | |
|---|---|---|---|
| 4,244,623 A | 1/1981 | Hall et al. | |
| 4,828,323 A | 5/1989 | Brodersen et al. | |
| 5,382,079 A * | 1/1995 | Wilson | A47C 1/03 297/411.36 |
| 5,597,209 A | 1/1997 | Bart et al. | |
| 5,649,741 A * | 7/1997 | Beggs | A47C 7/402 297/411.36 |
| 6,540,300 B2 * | 4/2003 | Piretti | A47C 1/03 297/411.36 |
| 7,726,745 B2 | 6/2010 | Bruns et al. | |

(Continued)

FOREIGN PATENT DOCUMENTS

| EP | 0937426 A2 | 8/1999 |
|---|---|---|
| KR | 20190069732 A | 6/2019 |

OTHER PUBLICATIONS

Extended Search Report in European Application No. 21198976.9 dated Feb. 11, 2022, 15 pages.

*Primary Examiner* — Anthony D Barfield
(74) *Attorney, Agent, or Firm* — Suiter Swantz pc llo

(57) ABSTRACT

The present disclosure provides a deployable and height adjustable armrest assembly for use with, for example, an aircraft pilot seat. The assembly includes an armrest positioned atop a rack comprising a plurality of detents each corresponding to a deployed armrest position. A lever carries a pawl that travels along one edge of the rack which locates in a selected one of the plurality of detents to lock the armrest in one of its deployed positions. The armrest is configured to be raised manually to deploy and adjust the armrest upward. The lever is configured to be actuated manually to disengage the pawl from its engagement in one of the detents to lower or return the armrest to its stowed positions. The armrest is particularly advantageous in close quarters such as a flight deck, or where a stowed armrest can be used to expand the width of the seat bottom.

15 Claims, 10 Drawing Sheets

(56) References Cited

U.S. PATENT DOCUMENTS

| | | |
|---|---|---|
| 7,828,390 B2 | 11/2010 | Liu et al. |
| 9,351,575 B2 * | 5/2016 | Hector .................... A47C 7/54 |
| 9,758,074 B1 | 9/2017 | Lin et al. |
| 2002/0043863 A1 | 4/2002 | Roslund et al. |
| 2004/0095008 A1 | 5/2004 | Marini |
| 2014/0117736 A1 | 5/2014 | Colasanti et al. |

* cited by examiner

DEPLOYABLE ARMREST WITH PAWL AND RATCHET HEIGHT ADJUSTMENT MECHANISM

CROSS-REFERENCE TO RELATED APPLICATION

This non-provisional application claims the benefit of U.S. Provisional Application No. 63/082,542 filed Sep. 24, 2020, the disclosure of which is incorporated by reference herein in its entirety.

TECHNICAL FIELD AND BACKGROUND

The present disclosure relates generally to a deployable and adjustable armrest assembly, and more particularly, to a deployable armrest including height adjustment capability via a pawl and ratchet mechanism advantageous for use in close quarters, for instance with a pilot seat in an aircraft flight deck.

Aircraft flight decks are typically configured around pilot seats and aircraft controls. Flight decks that include two pilot seats, positioned side-by-side, typically include a center console. Flight decks that include one or more pilot seats also typically include outboard consoles, each positioned to one side of its respective pilot seat. In most flight deck configurations, each console is typically positioned in close proximity to its respective seat considering the relatively narrow width of a flight deck and tapering sidewalls.

Pilot seats, like other seat types, may include adjustable elements for improving seat comfort. One such element includes deployable armrests. In a conventional rotary wing aircraft pilot seat, for example the partial pilot seat shown in prior art FIG. 10, each armrest is configured to stow in a recess formed in the seat back and deploy to a substantially horizontal use position. As shown, the armrest is coupled to a sliding axle about which the armrest pivots between vertical and horizontal orientations. To deploy the armrest, the pilot is required to reach behind the seat, locate the armrest, slide the armrest away from the recess, and finally rotate the armrest downward toward horizontal. Access to the armrest and deployment can be difficult considering the stowed location of the armrest and close proximity of an adjacent console. In addition, because the armrest is coupled to the seat back, the armrest requires a tilt adjustment mechanism to compensate for seat back recline motion.

As flight decks become more crowded, and as the demand for pilot seats to become more stylized increases, locating the stowed armrest alongside the seat back makes access difficult and also disrupts the styling cues of the seat.

Therefore, what is needed is an armrest assembly that facilitates easy stowing and deployment, does not disrupt the seat styling cues, and obviates the need for a tilt adjustment mechanism.

BRIEF SUMMARY

To achieve the foregoing and other advantages, in a first aspect the present disclosure provides an armrest assembly generally including a support bracket configured to attach to a seat element, a rack receiver coupled to the support bracket, and a rack slidable relative to the rack receiver, the rack including an elongate slot formed along a longitudinal length of the rack and a plurality of detents formed along one edge of the rack, each of the plurality of detents corresponding to an armrest deployment position. An armrest is positioned atop the rack and space guides carried by the rack receiver are engaged in the elongate slot of the rack. A lever is pivotally attached to the rack receiver and a pawl carried by the lever is configured to engage in the plurality of detents, one at a time, to lock the armrest in a selected armrest deployment position. A biasing member is coupled between the lever and the rack receiver to bias the pawl toward an engaged position. In use, the armrest is adjustable, for instance via manual lifting, between a stowed position alongside a seat bottom and one of a one of plurality of discrete armrest deployment positions.

In some embodiments, the plurality of detents are positioned proximate a lower end of the one edge of the rack, and none of the plurality of detents are positioned proximate an upper end of the one edge of the rack.

In some embodiments, each of the plurality of detents is formed by a first surface and a second surface angled relative to the first surface.

In some embodiments, a pawl roller is rotatably carried on a free end of the pawl and is configured to travel along and maintain engagement with the one edge of the rack as the armrest is raised.

In some embodiments, the support bracket and the rack receiver are integrally formed, and the rack is slidably disposed in the rack receiver.

In some embodiments, the armrest is configured to be raised to move the armrest from the stowed position to a first armrest deployment position, the armrest is configured to be raised from the first armrest deployment position to a second and successive armrest deployment positions, and the lever is configured to be actuated to disengage the pawl from engagement in one of the plurality of detents.

In some embodiments, a pivot axis of the lever is positioned forward of the one edge of the rack.

According to another aspect, the present disclosure provides a pilot seat assembly including a seat frame supporting a seat bottom, and an armrest assembly attached to the seat frame. The armrest assembly includes a support bracket attached to the seat frame, a rack receiver coupled to the support bracket, and a rack slidable relative to the rack receiver. The rack includes an elongate slot formed along a longitudinal length of the rack and a plurality of detents formed along one edge of the rack, each of the plurality of detents corresponding to an armrest deployment position. An armrest is positioned atop the rack and space guides carried by the rack receiver are engaged in the elongate slot of the rack. A lever is pivotally attached to the rack receiver and a pawl is carried by the lever, the pawl configured to engage in one of the plurality of detents to lock the armrest in a selected armrest deployment position. A biasing member coupled between the lever and the rack receiver biases the pawl toward an engaged position.

In some embodiments, the armrest when in the stowed positioned is laterally adjacent one side of the seat bottom such that a top surface of the armrest when in the stowed position is horizontally aligned with a top surface of the seat bottom adjacent the armrest.

In some embodiments, a pivot axis of the lever is positioned forward of the one edge of the rack, the plurality of detents are positioned proximate a lower end of the one edge of the rack, none of the plurality of detents are positioned proximate an upper end of the one edge of the rack, and the lever is positioned above the support bracket and below the armrest.

In some embodiments, the armrest is configured to be raise manually to move the armrest from the stowed position to a first armrest deployment position, the armrest is configured to be raised manually from the first armrest deployment position to a second and successive armrest deployment positions, and the lever is configured to be actuated manually to disengage the pawl engagement in one of the plurality of detents.

Embodiments of the present disclosure may include or more or any combination of the above features and elements.

This brief summary is provided solely as an introduction to subject matter that is fully described in the detailed description and illustrated in the drawings. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
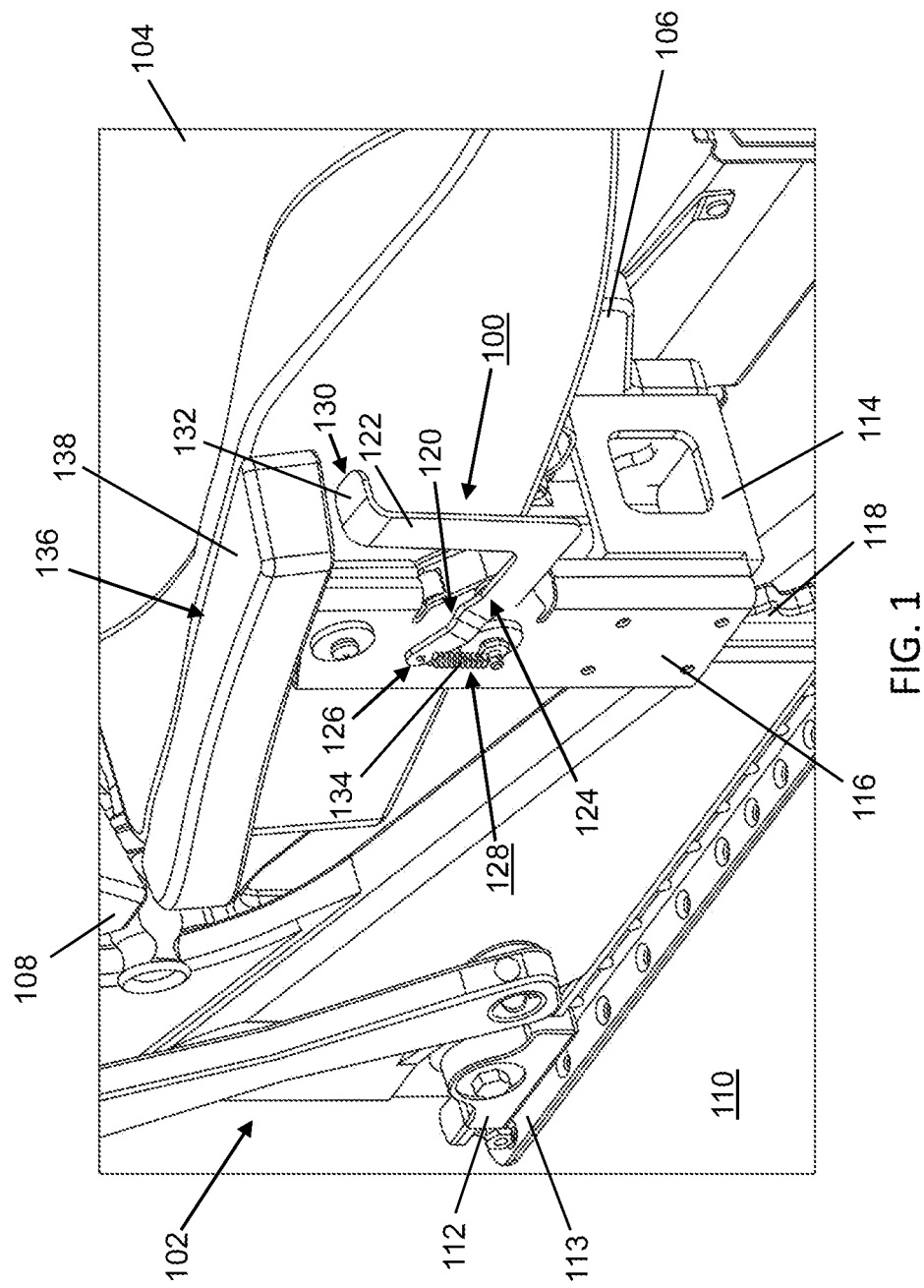
FIG. 1 is a front perspective view of a portion of a pilot seat equipped with an armrest assembly in accordance with an embodiment of the present disclosure, showing the armrest in a fully stowed position.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

In addition, as used herein, any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the inventive concepts disclosed herein are directed to a deployable and height adjustable armrest assembly for use with a seat, for instance a pilot seat for rotary wing and other aircraft types. Adjustability is provided through a predetermined number of possible elevated armrest positions. In use, the armrest can be lifted to a first and subsequent raised positions, and downward force applied to a handle releases the armrest to allow the armrest to be lowered. As such, single handed operation can be used to raise the armrest for ease of use.

FIG. 1 shows a non-limiting example of a pilot seat equipped with an armrest assembly 100 according to an embodiment of the present disclosure. The pilot seat 102 generally includes a seat bottom 104 supported by or atop a frame 106. A seat back 108 attaches to the frame 106 and/or seat bottom 104. The frame 106 may secure to the deck 110 via track fasteners 112 configured to attach to seat tracks 113 positioned on or in the deck 110. The configuration of the pilot seat 102 is not critical to the present disclosure as the armrest assembly 100 is compatible for use with different types and configurations of seats.

The armrest assembly 100 generally includes a support bracket 114 configured for attachment to a seat element, for instance the frame 106, for example a seat spreader, supporting the seat bottom 104. The frame 106 may be fixed or moveable and in a preferred embodiment, the armrest assembly 100 is attachable to the frame such that the seat bottom 104 and armrest assembly 100 move together but not relative to each other. As shown, the support bracket 114 may be constructed from a rigid material (e.g., aluminum) and attaches to the frame by way of fasteners, welding, etc.

A rack receiver 116 couples to the support bracket 114 and is positioned laterally adjacent one side of the seat bottom 104. In some embodiments, the rack receiver 116 is an elongate tubular member having an open top and bottom through which a rack 118 is received such that portions are coextensive. In some embodiments, the orientation of the rack receiver 116 determines the angle of the rack 118, which may be vertical or near vertical. A forward extending portion 120 of the rack receiver 116 serves as the attachment location for a lever 122 manually actuated to release the rack 118 to lower the armrest as discussed below. The horizontal pivot axis 124 of the lever 122 is positioned forward of the rack 118.

The lever 122 includes a first end 126 that extends rearward and is coupled to the rack receiver 116 via a biasing mechanism 128, and a second end 130 that extends forward and forms a handle 132 for gripping the lever 122. In some embodiments, the biasing mechanism 128 includes a helical spring 134 having a first end attached to the first end 126 of the lever 122, and a second end attached to the rack receiver 116 or a feature coupled to the rack receiver 116, first instance a guide as discussed below. In use, the biasing mechanism 128 biases the lever 122 toward an engaged position as discussed below. Although the lever 122 configuration shown allows for manual actuation, it is envisioned and intended that the adjustment mechanism may be electronically or otherwise controlled, for example via an actuator coupled to a pulling cable and switch.

An armrest 136 is positioned atop the rack 118 and includes an arm pad 138 that may be cushioned and/or upholstered. FIG. 1 shows the fully stowed position of the armrest 136 in which the top surface of the arm pad 138 resides coplanar with the top surface of the seat bottom 104. In some embodiments, the armrest 136 and the seat bottom 104 are similarly contoured such that when the armrest 136 is stowed the armrest 136 is essentially invisible, does not disrupt the styling cues of the seat, and increases the lateral space of the seat bottom 104. Such a configuration may allow the pilot seat 102 equipped with the armrest assembly 100 to meet minimum ergonomic seat pan requirements.

Figure 2:
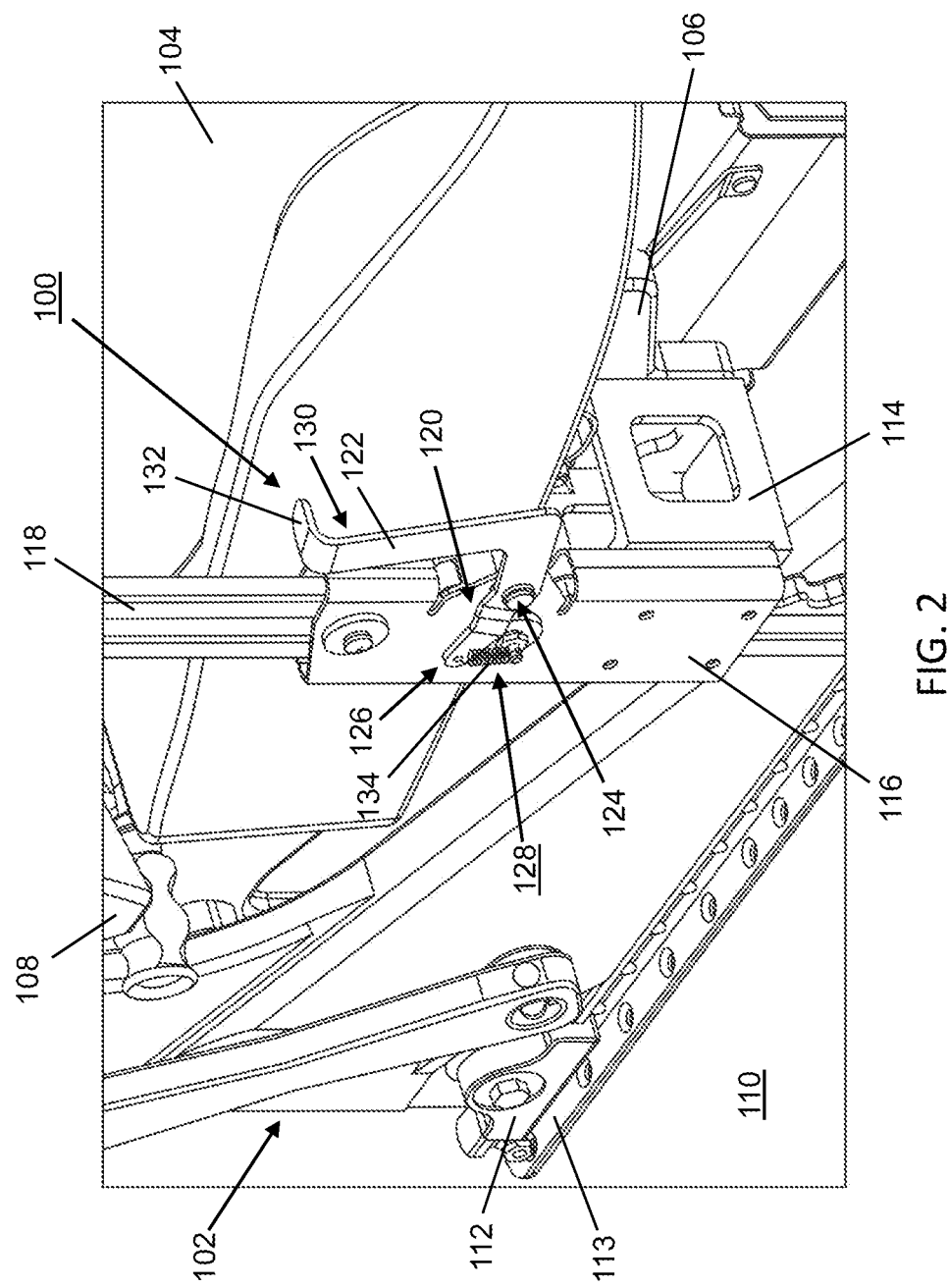
FIG. 2 is a front perspective view of the pilot seat of FIG. 1 showing the armrest in a fully raised position.

FIG. 2 shows the rack 118 raised relative to the rack receiver 116 to position the armrest (not shown) in a predetermined deployed position for use (i.e., raised). The rack 118 may be raised by lifting the armrest 136 manually with one hand for ease of use. FIG. 2 shows the lever handle 132 tilted slightly rearward which corresponds to an engaged or locked condition of the lever 122. FIG. 1 shows the lever handle 132 tilted slightly forward which corresponds to a disengaged or unlocked condition of the lever 122. The rack 118 may or may not include a detent for locking the rack 118 in a position corresponding to the fully stowed position of the armrest.

Figure 3:
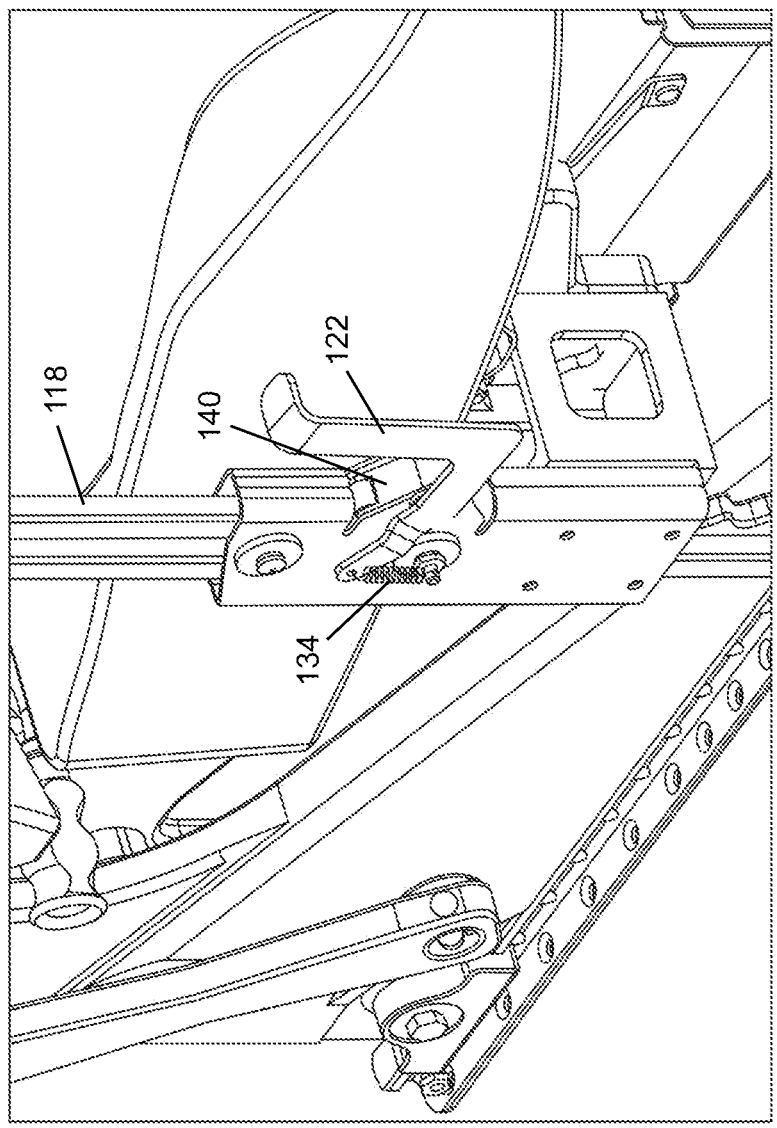
FIG. 3 is a front perspective view of the pilot seat of FIG. 1 showing the armrest locked in a deployed position.

FIG. 3 shows the lever 122 tiled forward corresponding to a disengaged or unlocked condition of the lever. The lever 122 may be pivoted forward manually by hand by pushing downward, or may be pivoted forward by the engagement of a pawl 140 carried by the lever 122 as the pawl 140 travels over a feature formed along a forward end of the rack 118, as discussed below. FIG. 3 further shows the helical spring 134 extended and therefore energized to provide the force to bias the lever 122 toward the engaged position.

Figure 4:
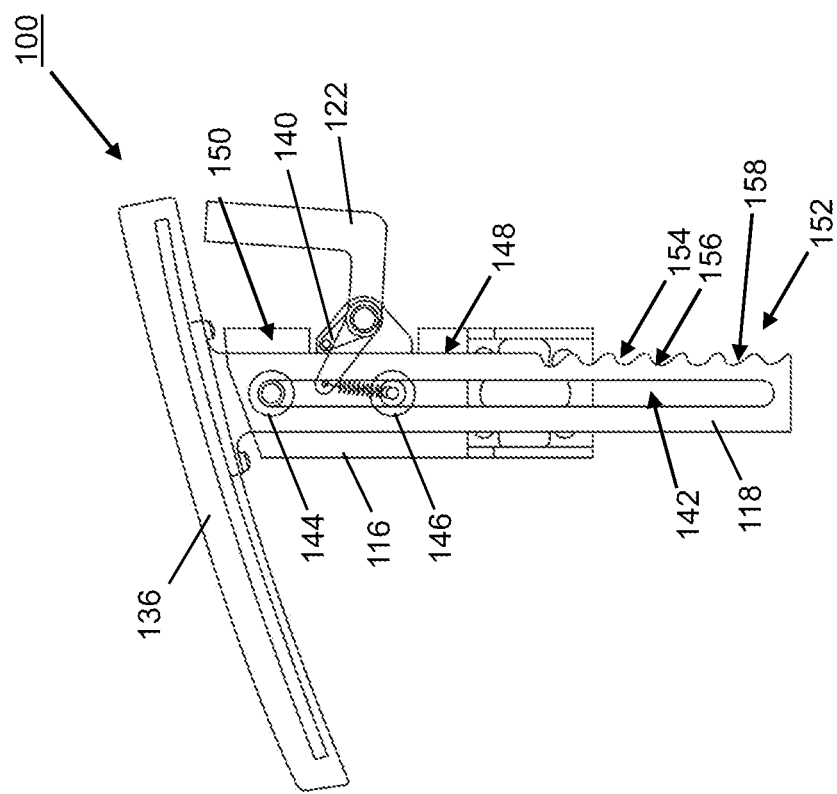
FIG. 4 is a side elevation view of the armrest assembly showing the armrest in a fully stowed position.

FIG. 4 shows the armrest assembly 100 removed from a seat for clarity of the assembly. The rack 118 is an elongate member forming a longitudinally extending slot 142 within which spaced guides 144, 146 carried on the rack receiver 116 travel along. The guides 144, 146 are spaced apart such that the rack 118 tracks linearly up and down relative to the rack receiver 116 with stability and without rotating. The upper guide 144 may be positioned relative to the rack receiver 118 to provide a physical stop against over travel of the rack 118 downward. The lower guide 146 may be positioned relative to the rack receiver 118 to provide a physical stop against over travel of the rack 118 upward. The upper and lower guides 144, 146 may be posts having a flanged head or vertical rollers that function to guide and maintain vertical motion of the rack 118 between its fully raised and fully lowered positions.

The pawl 140 is carried by the lever 122 and therefore moves in and out of contact with the rack 118 with the movement of the lever 122. FIG. 4 shows the armrest 136 in a fully stowed condition proximate to the top end of the rack receiver 116, a portion of which is removed in the drawing for clarity. The forward edge 148 of the rack 118 forms a bearing surface along which the pawl 140 travels and maintains engagement, at least when the lever 122 is not fully disengaged. The bearing surface includes an upper portion 150 and a lower portion 152. The upper portion 150 is linear and featureless such that the pawl 140 tracks along the linear upper portion from the fully stowed position until the first deployment position.

The lower portion 152 forms a plurality of detents 154 each formed by a first surface 156 and a second surface 158 angled relative to the first surface 156. Each detent 154 serves as a 'catch' for the pawl 140 and corresponds to a raised position of the armrest 136. The plurality of detents 154 are arranged vertically such that each successive detent 154, from top to bottom, corresponds to a higher armrest position. As shown, the rack 118 includes seven detents corresponding to seven possible deployed armrest positions. In some embodiments, the lowest detent or more may or may not be functional. Any number of detents are possible, as well as the positions of the detents and spacing therebetween, depending on the number of desired discrete armrest positions.

Figure 5:
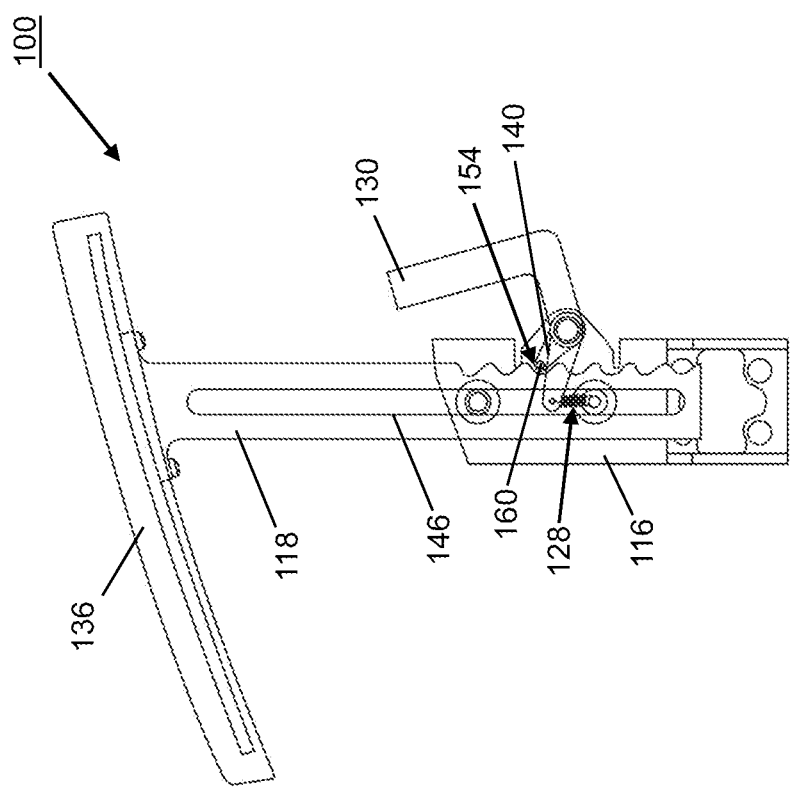
FIG. 5 is a side elevation view of the armrest assembly showing the armrest locked in a first deployed position.

FIG. 5 shows the pawl 140 engaged in the third detent 154 from the top, which corresponds to a third deployed position of the armrest 136. In some embodiments, the pawl 140 carries a pawl roller 160 on its free for facilitating rolling engagement and smooth tracking and transition between detents. The free end of the pawl 140 carrying the pawl roller 160 is angled upward to engage within the detents 154 formed along the forward edge of the rack 118 each corresponding to a discrete armrest position. When the pawl 140 is engaged in one of the detents 154, the rack 118 is prevented from lowering. The first surface (156 in FIG. 4) of each detent is angled upward to prevent the pawl 140 from disengaging from the detent under the force of the biasing mechanism 128. The second surface (158 in FIG. 4) is angled downward such that, upon raising the armrest 136, the pawl roller 160 tracks along the second surface, tracks along the transitional portion between detents, and locates into the next lower detent. The handle 130 is pivoted forward, such as by pushing downward, against the force of the biasing mechanism 128 to disengage the pawl 140 from the detent to allow the armrest 136 to be lowered to another lower deployed position or to stow the armrest 136.

In use, single handed operation can be used to raise the armrest 136, as none of the engagement surfaces formed on the forward end of the rack 118 resist or prevent upward movement of the rack 118. In use, two-handed operation can be used to lower the armrest 136 gently, with one hand operating the lever 122 and the other hand grabbing the armrest 136. Alternatively, single handed lowering is possible simply by actuating the lever 122, but may be undesirable for allowing the armrest 134 to drop uncontrollably.

Figure 6:
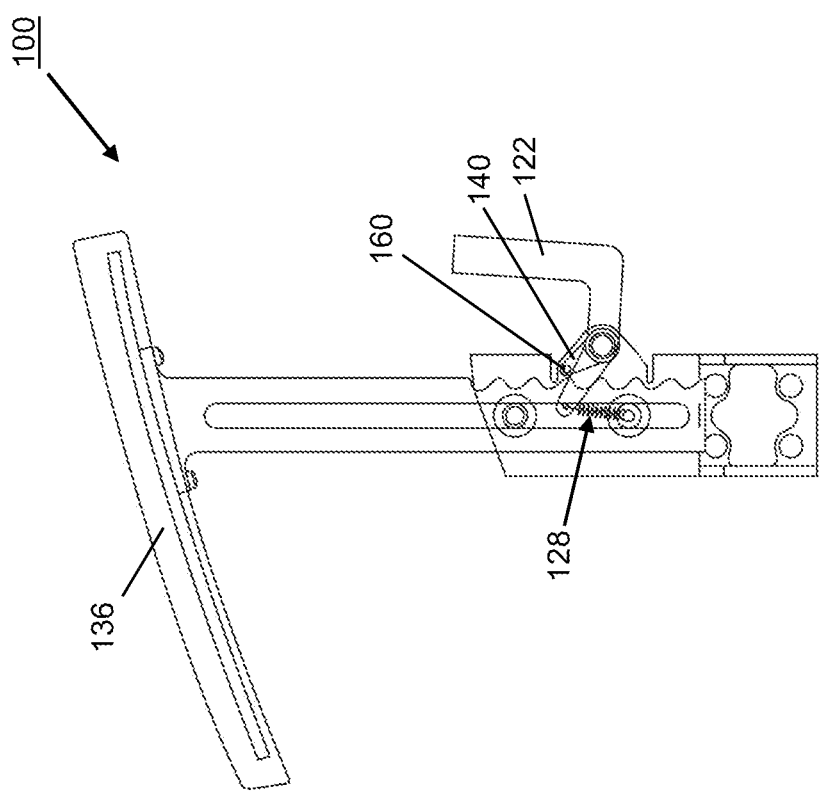
FIG. 6 is a side elevation view of the armrest assembly showing the armrest unlocked and being moved to a second deployed position.
Figure 7:
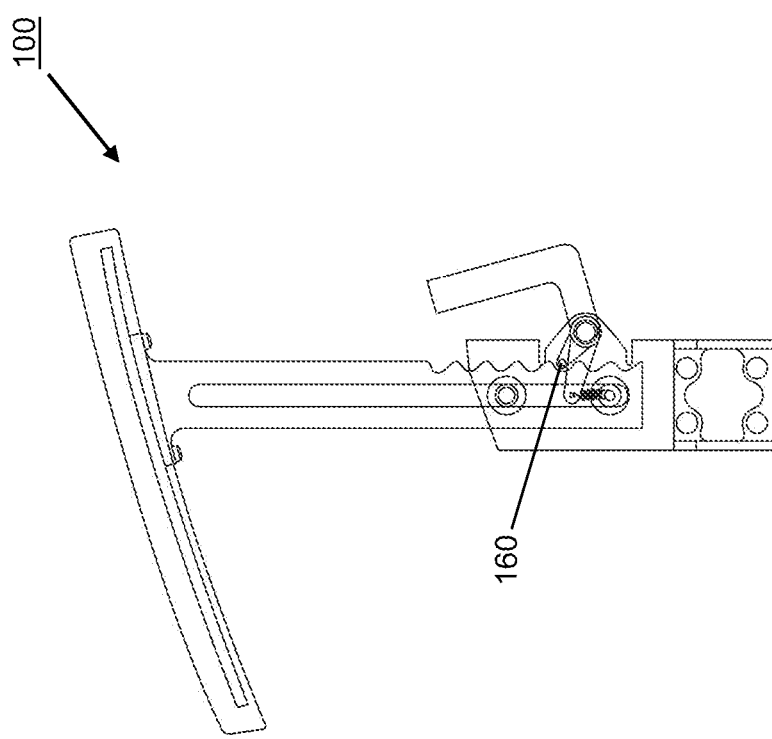
FIG. 7 is a side elevation view of the armrest assembly showing the armrest locked in the second deployed position.

FIG. 6 shows the pawl roller 160 transitioning from the third detent, corresponding to the third armrest deployment position, to the fourth detent, corresponding armrest deployment position, by tracking over the transitional 'peak' provided between the third and fourth 'troughs.' A shown, the pawl roller 160 tracks along the surface features thereby causing the lever 122 to pivot against the force of the biasing mechanism 128, and the action of the biasing mechanism causing the pawl roller 160 to remain engaged against and follow the formed surface features, thereby locating the pawl 140 in each successive detent. As such, the armrest 136 can be raised to the desired deployment height and the pawl locates in the respective detent automatically. FIG. 7 shows the pawl roller 160 engaged in the fifth detent from the top corresponding to the fifth discrete armrest position.

Figure 8:
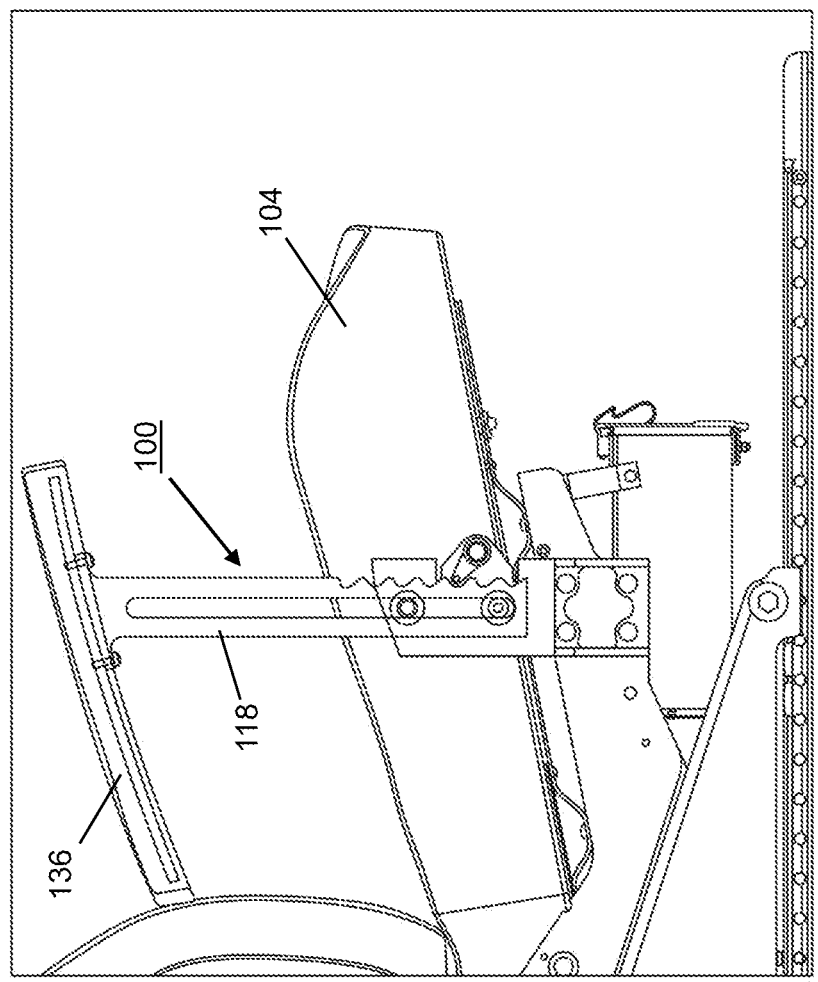
FIG. 8 is a side elevation view of the pilot seat of FIG. 1 showing the armrest locked in the second deployed position shown in FIG. 7.

FIG. 8 shows the armrest assembly 100 installed on a non-limiting example of a seat and with the armrest 136 shown in the fifth detent corresponding to the fifth highest position of the armrest 136. Understandable from FIG. 8, the first or uppermost detent positions the armrest 136 closest the seat bottom 104, and each successive lower detent positions the armrest 136 farther from the seat bottom 104. Again, the number, position and spacing of the detents is customizable to provide any number of adjustable positions and to accommodate different seat designs. As shown, the uppermost or first detent is provided spaced apart from the armrest 136, for example several inches, such that the rack 118 is required to be raised several inches before reaching the first engagement. This configuration provides spacing between the armrest 136 and handle (removed for clarity) for comfortably locating and actuating the handle, and may correspond to the first desirable position of the deployed armrest 164. A shroud may serve to cover portions of the assembly for aesthetic reasons and to conceal pinch points.

Figure 9:
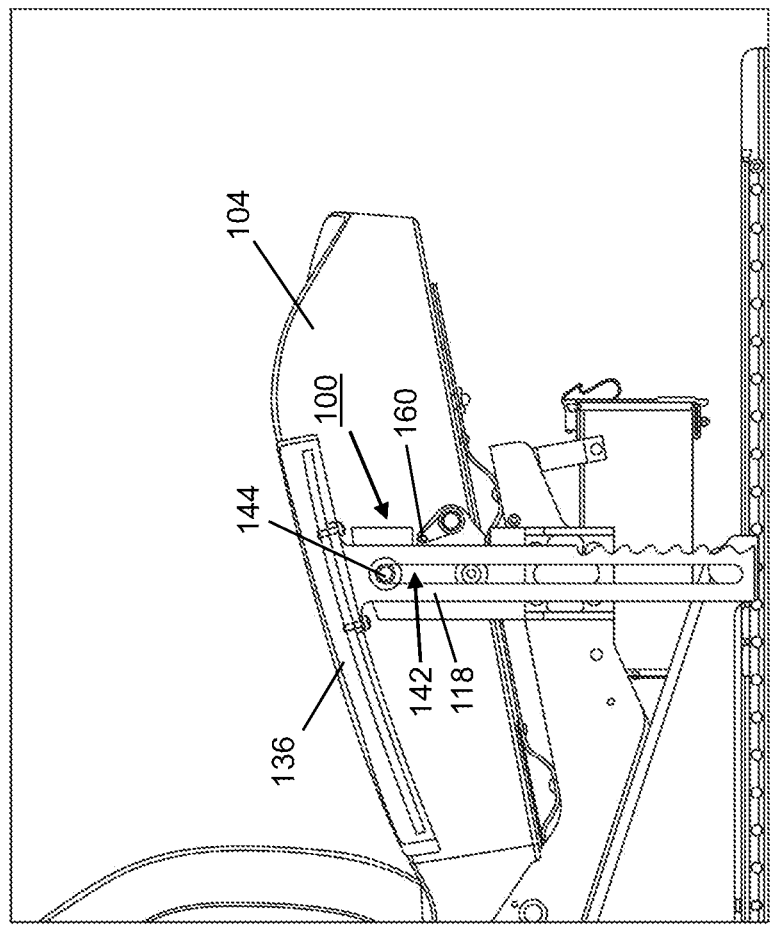
FIG. 9 is a side elevation view of the pilot seat of FIG. 1 showing the armrest in the fully stowed position.
Figure 10:
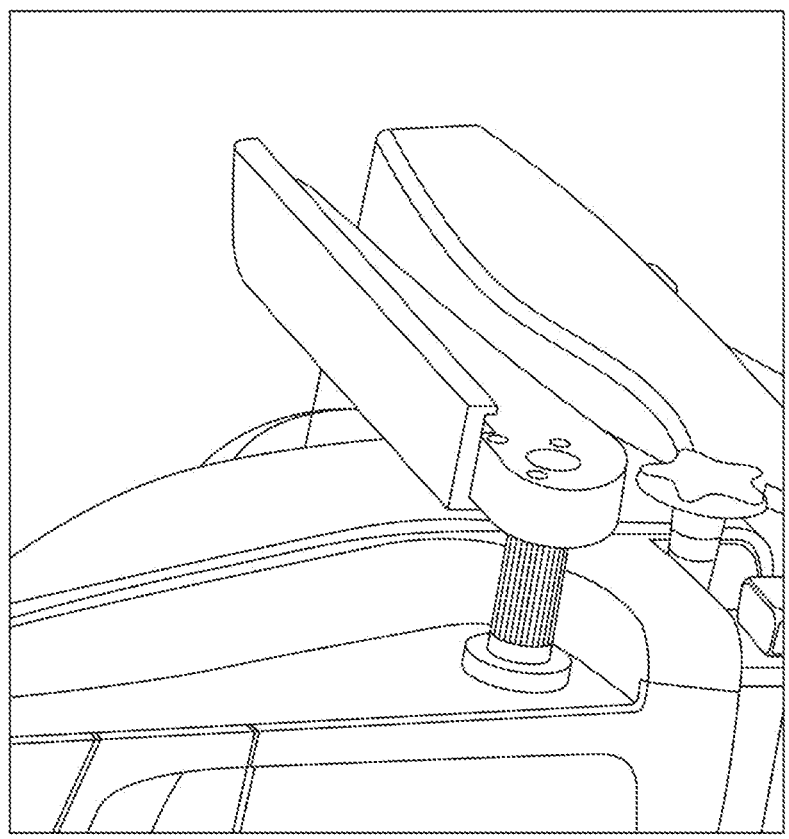
FIG. 10 is a rear perspective view of a pilot seat equipped with a conventional deployable armrest.

FIG. 9 shows the armrest 136 full stowed such that the pawl roller 160 is engaged along the linear upper portion of the rack 118 and the upper guide 144 engaging the upper end of the elongate slot 142 to prevent over travel of the rack 118 downward. FIG. 9 further illustrates the coplanarity of the top of the armrest 136 with the top of the seat bottom 104 to increase the lateral space of the seat bottom 104.

While the right-side armrest assembly is been shown throughout the drawings, it is intended and understood that the seat may be equipped with left and right armrest assemblies symmetrically arranged on the respective left and right sides of the seat.

What is claimed is:

1. An armrest assembly, comprising:
   a support bracket configured to attach to a seat element;
   a rack receiver coupled to the support bracket;
   a rack slidable relative to the rack receiver, the rack including an elongate slot formed along a longitudinal length of the rack and a plurality of detents formed along one edge of the rack, each of the plurality of detents corresponding to an armrest deployment position;
   an armrest positioned atop the rack;
   space guides carried by the rack receiver and engaged in the elongate slot of the rack;
   a lever pivotally attached to the rack receiver;
   a pawl carried by the lever, the pawl configured to engage in the plurality of detents to lock the armrest in a selected armrest deployment position; and
   a biasing member coupled between the lever and the rack receiver biasing the pawl toward an engaged position;
   wherein, in use, the armrest is adjustable between a stowed position and a plurality of discrete armrest deployment positions.

2. The armrest assembly according to claim 1, wherein the plurality of detents are positioned proximate a lower end of the one edge of the rack, and wherein none of the plurality of detents are positioned proximate an upper end of the one edge of the rack.

3. The armrest assembly according to claim 1, wherein each of the plurality of detents is formed by a first surface and a second surface angled relative to the first surface.

4. The armrest assembly according to claim 1, wherein:
   a pawl roller is rotatably carried on a free end of the pawl; and
   the pawl roller travels along and maintains engagement with the one edge of the rack as the armrest is raised.

5. The armrest assembly according to claim 1, wherein the support bracket and the rack receiver are integrally formed.

6. The armrest assembly according to claim 1, wherein the rack is slidably disposed in the rack receiver.

7. The armrest assembly according to claim 1, wherein:
   the armrest is configured to be raised to move the armrest from the stowed position to a first armrest deployment position;
   the armrest is configured to be raised from the first armrest deployment position to a second and successive armrest deployment positions; and
   the lever is configured to be actuated to disengage the pawl from engagement in one of the plurality of detents.

8. The armrest assembly according to claim 1, wherein a pivot axis of the lever is positioned forward of the one edge of the rack.

9. A pilot seat assembly, comprising:
   a seat frame supporting a seat bottom; and
   an armrest assembly attached to the seat frame, the armrest assembly comprising:
      a support bracket attached to the seat frame;
      a rack receiver coupled to the support bracket;
      a rack slidable relative to the rack receiver, the rack including an elongate slot formed along a longitudinal length of the rack and a plurality of detents formed along one edge of the rack, each of the plurality of detents corresponding to an armrest deployment position;
      an armrest positioned atop the rack;
      space guides carried by the rack receiver and engaged in the elongate slot of the rack;
      a lever pivotally attached to the rack receiver;
      a pawl carried by the lever, the pawl configured to engage in the plurality of detents to lock the armrest in a selected armrest deployment position; and
      a biasing member coupled between the lever and the rack receiver biasing the pawl toward an engaged position.

10. The pilot seat assembly according to claim 9, wherein the armrest when in the stowed positioned is laterally adjacent one side of the seat bottom, and wherein a top surface of the armrest when in the stowed position is horizontally aligned with a top surface of the seat bottom adjacent the armrest.

11. The pilot seat assembly according to claim 9, wherein:
   a pivot axis of the lever is positioned forward of the one edge of the rack;
   the plurality of detents are positioned proximate a lower end of the one edge of the rack; and
   none of the plurality of detents are positioned proximate an upper end of the one edge of the rack.

12. The pilot seat assembly according to claim 9, wherein:
   each of the plurality of detents is formed by a first surface and a second surface angled relative to the first surface;
   a pawl roller is rotatably carried on a free end of the pawl; and the pawl roller is configured to travel along and maintain engagement with the one edge of the rack as the armrest is raised.

13. The pilot seat assembly according to claim 9, wherein the rack is slidably disposed in the rack receiver.

14. The pilot seat assembly according to claim 9, wherein:
the armrest is configured to be raised manually to move the armrest from the stowed position to a first armrest deployment position;
the armrest is configured to be raised manually from the first armrest deployment position to a second and successive armrest deployment positions; and
the lever is configured to be actuated manually to disengage the pawl engagement in one of the plurality of detents.

15. The pilot seat assembly according to claim 9, wherein the lever is positioned above the support bracket and below the armrest.

\* \* \* \* \*